United States Patent
Reiser et al.

(10) Patent No.: US 11,252,189 B2
(45) Date of Patent: Feb. 15, 2022

(54) ABUSE MAILBOX FOR FACILITATING DISCOVERY, INVESTIGATION, AND ANALYSIS OF EMAIL-BASED THREATS

(71) Applicant: Abnormal Security Corporation, San Francisco, CA (US)

(72) Inventors: Evan James Reiser, San Francisco, CA (US); Jeremy Kao, San Francisco, CA (US); Cheng-Lin Yeh, Menlo Park, CA (US); Yea So Jung, Oakland, CA (US); Kai Jing Jiang, San Francisco, CA (US); Abhijit Bagri, Oakland, CA (US); Su Li Debbie Tan, San Mateo, CA (US); Venkatram Krishnamoorthi, San Jose, CA (US); Fang Shuo Deng, Berkeley, CA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

(21) Appl. No.: 17/155,843

(22) Filed: Jan. 22, 2021

(65) Prior Publication Data
US 2021/0273976 A1    Sep. 2, 2021

Related U.S. Application Data

(60) Provisional application No. 62/984,098, filed on Mar. 2, 2020.

(51) Int. Cl.
*H04L 29/06* (2006.01)
*G06F 16/9035* (2019.01)
*G06Q 10/10* (2012.01)

(52) U.S. Cl.
CPC ...... *H04L 63/1483* (2013.01); *G06F 16/9035* (2019.01); *G06Q 10/107* (2013.01); *H04L 63/1416* (2013.01); *H04L 63/1425* (2013.01)

(58) Field of Classification Search
CPC ............ H04L 63/1483; H04L 63/1425; H04L 63/1416; G06F 16/9035; G06Q 10/107
See application file for complete search history.

(56) References Cited

U.S. PATENT DOCUMENTS 10,104,029 B1    10/2018  Chambers
10,397,272 B1 *   8/2019  Bruss ................... G06F 21/568
(Continued)

OTHER PUBLICATIONS

Proofpoint (Proofpoint Closed-Loop Email Analysis and Response, Aug. 2018, 2 pages) (Year: 2018).*
(Continued)

*Primary Examiner* — Oleg Korsak
(74) *Attorney, Agent, or Firm* — Van Pelt, Yi & James LLP

(57) ABSTRACT

Introduced here are computer programs and computer-implemented techniques for discovering malicious emails and then remediating the threat posed by those malicious emails in an automated manner. A threat detection platform may monitor a mailbox to which employees of an enterprise are able to forward emails deemed to be suspicious for analysis. This mailbox may be referred to as an "abuse mailbox" or "phishing mailbox." The threat detection platform can examine emails contained in the abuse mailbox and then determine whether any of those emails represent threats to the security of the enterprise. For example, the threat detection platform may classify each email contained in the abuse mailbox as being malicious or non-malicious. Thereafter, the threat detection platform may determine what remediation actions, if any, are appropriate for addressing the threat posed by those emails determined to be malicious.

24 Claims, 17 Drawing Sheets

(56) References Cited

U.S. PATENT DOCUMENTS

| | | | |
|---|---|---|---|
| 10,911,489 B1* | 2/2021 | Chechik | H04L 63/1483 |
| 10,972,483 B2* | 4/2021 | Thomas | H04L 63/1441 |
| 10,972,485 B2* | 4/2021 | Ladnai | G06K 9/4638 |
| 2011/0213869 A1* | 9/2011 | Korsunsky | H04L 63/1483 |
| | | | 709/223 |
| 2011/0214157 A1* | 9/2011 | Korsunsky | H04L 63/1441 |
| | | | 726/1 |
| 2011/0231510 A1* | 9/2011 | Korsunsky | G06F 21/55 |
| | | | 709/213 |
| 2011/0231564 A1* | 9/2011 | Korsunsky | H04L 63/1483 |
| | | | 709/231 |
| 2011/0238855 A1* | 9/2011 | Korsunsky | G06F 21/56 |
| | | | 709/231 |
| 2016/0014151 A1 | 1/2016 | Prakash | |
| 2016/0057167 A1 | 2/2016 | Bach | |
| 2016/0301705 A1 | 10/2016 | Higbee et al. | |
| 2017/0230323 A1 | 8/2017 | Jakobsson | |
| 2017/0237754 A1* | 8/2017 | Todorovic | H04L 9/3247 |
| | | | 713/156 |
| 2018/0027006 A1* | 1/2018 | Zimmermann | H04L 63/0245 |
| | | | 726/11 |
| 2019/0081983 A1* | 3/2019 | Teal | G06F 21/50 |
| 2019/0166161 A1 | 5/2019 | Anand | |
| 2019/0166162 A1 | 5/2019 | Anand | |
| 2019/0190929 A1* | 6/2019 | Thomas | H04L 63/20 |
| 2019/0190936 A1* | 6/2019 | Thomas | H04L 43/10 |
| 2019/0199745 A1 | 6/2019 | Jakobsson et al. | |
| 2019/0222606 A1* | 7/2019 | Schweighauser | H04L 63/1483 |
| 2019/0319987 A1* | 10/2019 | Levy | G06N 5/046 |
| 2020/0053111 A1* | 2/2020 | Jakobsson | H04L 51/12 |
| 2020/0074078 A1* | 3/2020 | Saxe | H04L 63/1433 |
| 2020/0344251 A1* | 10/2020 | Jeyakumar | H04L 63/1416 |
| 2020/0389486 A1* | 12/2020 | Jeyakumar | H04L 63/1441 |
| 2020/0396258 A1* | 12/2020 | Jeyakumar | H04L 63/1441 |
| 2020/0412767 A1* | 12/2020 | Crabtree | H04W 12/121 |
| 2021/0021612 A1* | 1/2021 | Higbee | G06F 16/35 |
| 2021/0058395 A1* | 2/2021 | Jakobsson | H04L 63/0884 |

OTHER PUBLICATIONS

Author Unknown, Proofpoint Closed-Loop Email Analysis and Response, Nov. 2019, 2 pages.

* cited by examiner

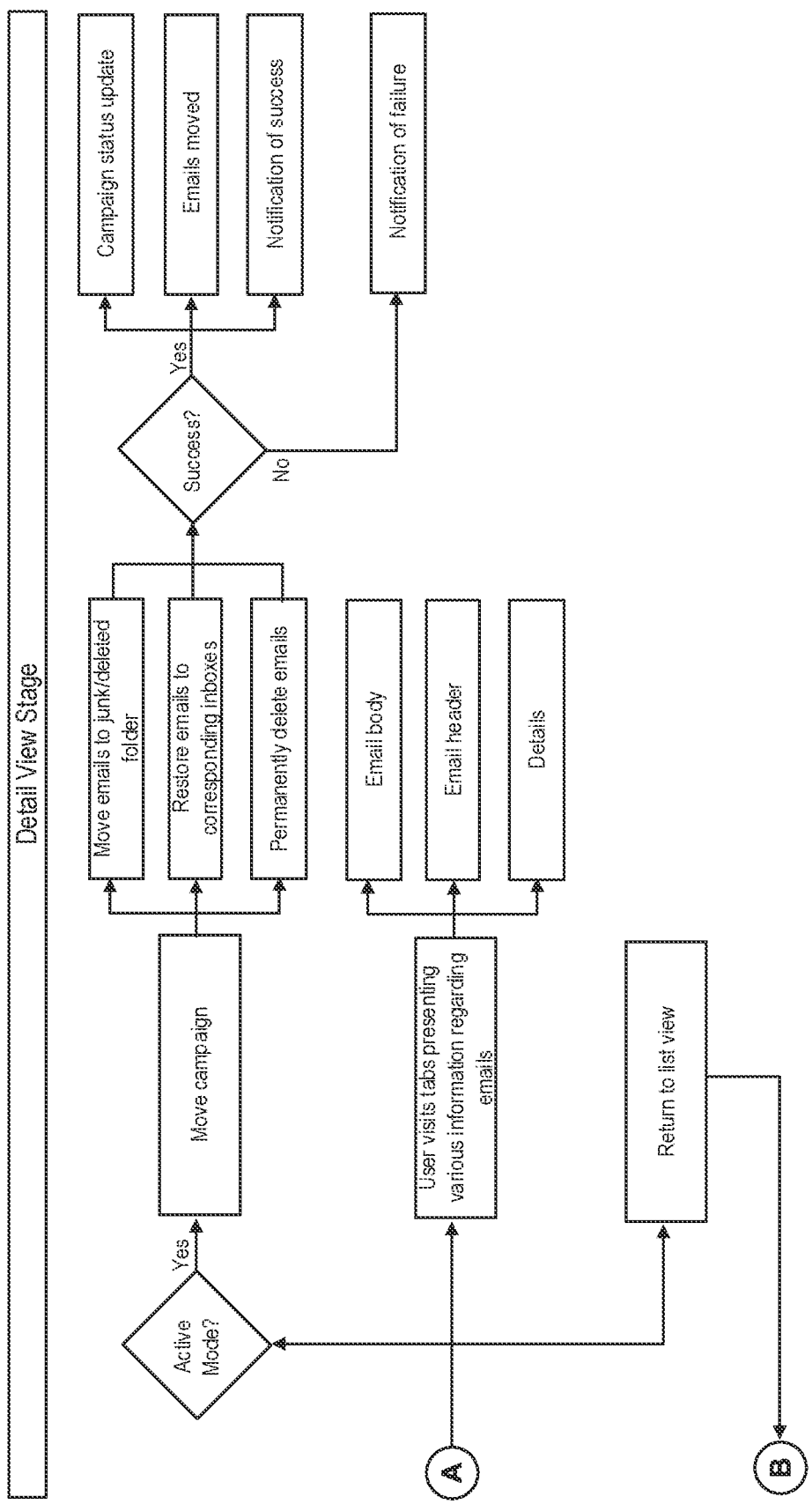
FIGURE 2, CONT.

| Internal Review | Internal History | Dashboard | Labeling |

Abuse Mailbox [BETA]

Filter By (+)

1. Display lists of user-reported phishing emails

| Subject | Last Reporter | From |
|---|---|---|
| Jerretta Posted: Transferable Skills Workshop!Thanks Angela Menefee for facilitatin.. | Longenbaugh, Tim<br>Tim.Longenbaugh@luminant.com | Vistra Energy Workplace Digest<br>notification@fbworkmail.com |
| Hello! remember me? I am Nicola, ex. coworker<br>▼ Spam | Johnston, Wade<br>Wade.Johnston@luminant.com | Nicola H.<br>dapikeocmh@mail2strong.com<br>▼ None/Others |
| america | Johnston, Wade<br>Wade.Johnston@luminant.com | Shahbaz Khan<br>Shahbazzkhan111@gmail.com |
| Soft Skills Library - Last Chance To Save! | Todd, Ben<br>Ben.Todd@luminant.com | Corporate Training Materials<br>maria@corporatetrainingmaterials.com |
| Shredding Point of Contact | Pointer, Janie<br>Janie.Pointer@luminant.com | Dontcheva, Slavena<br>Slavenadontcheva@stericycle.com |
| Alex Sierra has invited you to Jira | Fuller, Donnie<br>Donnie.Fuller@txj.com | Atlassian<br>noreply@atlassian.com |

FIGURE 4A

Internal: ( Vistra Energy [active mode] )  Customer Mode ◯  Nicole Jiang ⌄

2. Displays Email Judgement →

| Recipient(s) | Received | Last Reported | Judgement | Overall Status |
|---|---|---|---|---|
| Longenbaugh, Tim<br>Tim.Longenbaugh@luminant.com | 9 Hours Ago<br>Aug 18th 02:37 PM PDT | 9 Hours Ago<br>Aug 18th 02:37 PM PDT | Safe | No Action Needed |
| Johnston, Wade<br>Wadejohnston@luminant.com | 2 Days Ago<br>Aug 16th 07:39 PM PDT | 10 Hours Ago<br>Aug 18th 01:38 PM PDT | Malicious | Auto-Remediated |
| 4 Recipients | 2 Days Ago<br>Aug 16th 11:43 PM PDT | 10 Hours Ago<br>Aug 18th 01:38 PM PDT | Safe | No Action Needed |
| Todd, Ben<br>Ben.Todd@luminant.com | *******<br>Aug 18th 05:13 AM PDT | *******<br>Aug 18th 05:13 AM PDT | Safe | No Action Needed |
| Pointer, Janie<br>Janie.Pointer@luminant.com | A Day Ago<br>Aug 17th 02:37 PM PDT | A Day Ago<br>Aug 17th 02:37 PM PDT | Safe | No Action Needed |
| Fuller, Donnie<br>Donnie.Fuller@txj.com | 2 Days Ago<br>Aug 17th 11:03 AM PDT | 2 Days Ago<br>Aug 17th 11:03 AM PDT | Safe | No Action Needed |

3 + 4 Finds entire email campaign

FIGURE 4A (Cont.)

Abnormal Cases  Abuse Mailbox  Threat Log  Dashboard  Internal ( Vistra Energy (active mode) ) Customer Mode ⬤○ Nicole Jiang ⌄

[↵] Peloton Commercial Real Estate 15/08/2019          [ Remediate Email[s] > ]

ⓘ This abuse report was marked malicious by Abnormal Security at 08/16/2019 02:36 PM PDT.

Email Summary Email Body  Email Headers     7. Manual Remediation/Undo

Email Summary

5. Show additional info of reported phishing email

| | | |
|---|---|---|
| Subject | Peloton Commercial Real Estate 15/08/2019 | Last Reported By    Proctor, Tonya  TonyaProctor@txu.com |
| Sender | bill moebius  bmoebius@pelotoncre.com | Last Reported Time    2 days ago August 16th 2:36pm |
| Reply-to | | Attack Type    ▼ Credential Phishing |
| Last Recipient | Proctor, Tonya  TonyaProctor@txu.com | |
| Last Received Time | 4 days ago August 15th 9:23am | |

All Emails in Campaign (17)
All similar emails found by Abnormal Security across your Office 365 tenant     6. Automatically remediate email campaign
Campaign grouped by: [ Same Sender email address | Similar email subject ]

| Recipient Name | Email Address | Employee Title | Email Location | User Action (Beta) | Reported? | Status |
|---|---|---|---|---|---|---|
| Proctor, Tonya | TonyaProctor@txu.com | Business Markets Account Representative | | None | Yes | Auto-Remediated |
| Lene, Marc | MarcLenc@txu.com | Account Manager III | junkemail | None | No | Auto-Remediated |
| Driskall-Jones, Lauren | Lauren.driskall-jones @vistraenergy.com | Senior Pricing Analyst | junkemail | None | No | Auto-Remediated |
| Martindale, Lajuan | LajuanMartindale@txu.com | Sales Exec IV | junkemail | None | No | Auto-Remediated |

FIGURE 4B

Abuse Mailbox

Source: soc@company.com

- soc@company.com
  - TAP Notifications
  - All Sources

Abnormal Cases | Abuse Mailbox | Thread Log | Dashboard

Filter by: Threat Type: Malicious ✕

| Subject | Reporter | From | Recipient(s) |
|---|---|---|---|
| Critical: Update your billing information ⊙ Spam | Navigate to Tap Notifications to see all TAP email campaigns and perform remediation | | |
| Critical: Update your billing information ⊙ Spam | Ethan Gill egill@tamronba.com ▲ VIP | Jonathan Green jonathan.greenx2@gmail.com ▲ VIP | 293 Recipient Josh Waters jwaters@tamr ▲ VIP |
| Critical: Update your billing information ⊙ Spam | Ethan Gill egill@tamronba.com ▲ VIP | Jonathan Green jonathan.greenx2@gmail.com ▲ VIP | 333 Recipient |

1101
Determine that a first email has been forwarded by a first employee of an enterprise to a mailbox for analysis 1102
Establish that the first email was delivered as part of a business email compromise (BEC) campaign 1103
Examine an inbox associated with a second employee of the enterprise to identify a second email delivered as part of the BEC campaign 1104
Remediate the BEC campaign in an automated manner by extracting the second email from the inbox 1105
Notify a user of the threat posed by the BEC campaign

1201
Examine an email forwarded to a mailbox by an employee of an enterprise for analysis 1202
Determine that the email was delivered as part of an email scam 1203
Perform an action so as to automatically remediate a threat posed by the email scam 1204
Examine a second email forwarded to the mailbox by a second employee of the enterprise for analysis 1205
Determine that the second email does not pose a threat to the enterprise 1206
Move the second email to an inbox associated with the second employee

ABUSE MAILBOX FOR FACILITATING DISCOVERY, INVESTIGATION, AND ANALYSIS OF EMAIL-BASED THREATS

CROSS-REFERENCE TO RELATED APPLICATIONS

This application claims priority to U.S. Provisional Application No. 62/984,098, titled "Abuse Mailbox for Facilitating Investigation and Analysis of Email-Based Threats" and filed on Mar. 2, 2020, which is incorporated by reference herein in its entirety.

TECHNICAL FIELD

Various embodiments concern computer programs and associated computer-implemented techniques for discovering and then remediating scams carried out over email.

BACKGROUND

Email has become vastly more sophisticated with the Internet connecting millions of individuals in real time. These advancements in connectivity have incentivized cyber actors (also referred to as "attackers") to send malicious emails in greater numbers than ever before. Because email represents the primary communication channel for most enterprises (also referred to as "companies" or "organizations"), it is a primary point of entry for attackers.

Historically, enterprises employed secure email gateways to protect on-premises email. A secure email gateway is a mechanism-implemented in hardware or software—that monitors inbound and outbound emails to prevent the transmission of unwanted emails. However, such an approach is largely unsuitable for examining the vast number of emails handled by collaboration suites such as Microsoft Office 365® and G Suite™. For that reason, enterprises have begun employing security operations center (SOC) analysts who use security tools that employ artificial intelligence models, machine learning models, and filters to stop malware and email scams. Examples of email scams include phishing campaigns and business email compromise (BEC) campaigns. As an example, some enterprises define, prioritize, and respond to incidents through an approach referred to as mail-focused Security Orchestration, Automation, and Response (M-SOAR).

BRIEF DESCRIPTION OF THE DRAWINGS

FIGS. 4A-B include examples of interfaces that show how information regarding emails contained in the abuse mailbox can be conveyed to users.

FIG. 9 illustrates how emails discovered by another security tool may be viewed separate from those emails forwarded to the abuse mailbox by employees.

FIG. 11 includes a flow diagram of a process for identifying and then remediating business email compromise (BEC) campaigns.

FIG. 12 includes a flow diagram of a process for automatically remediating a threat posed by an email scam.

Figure 1:
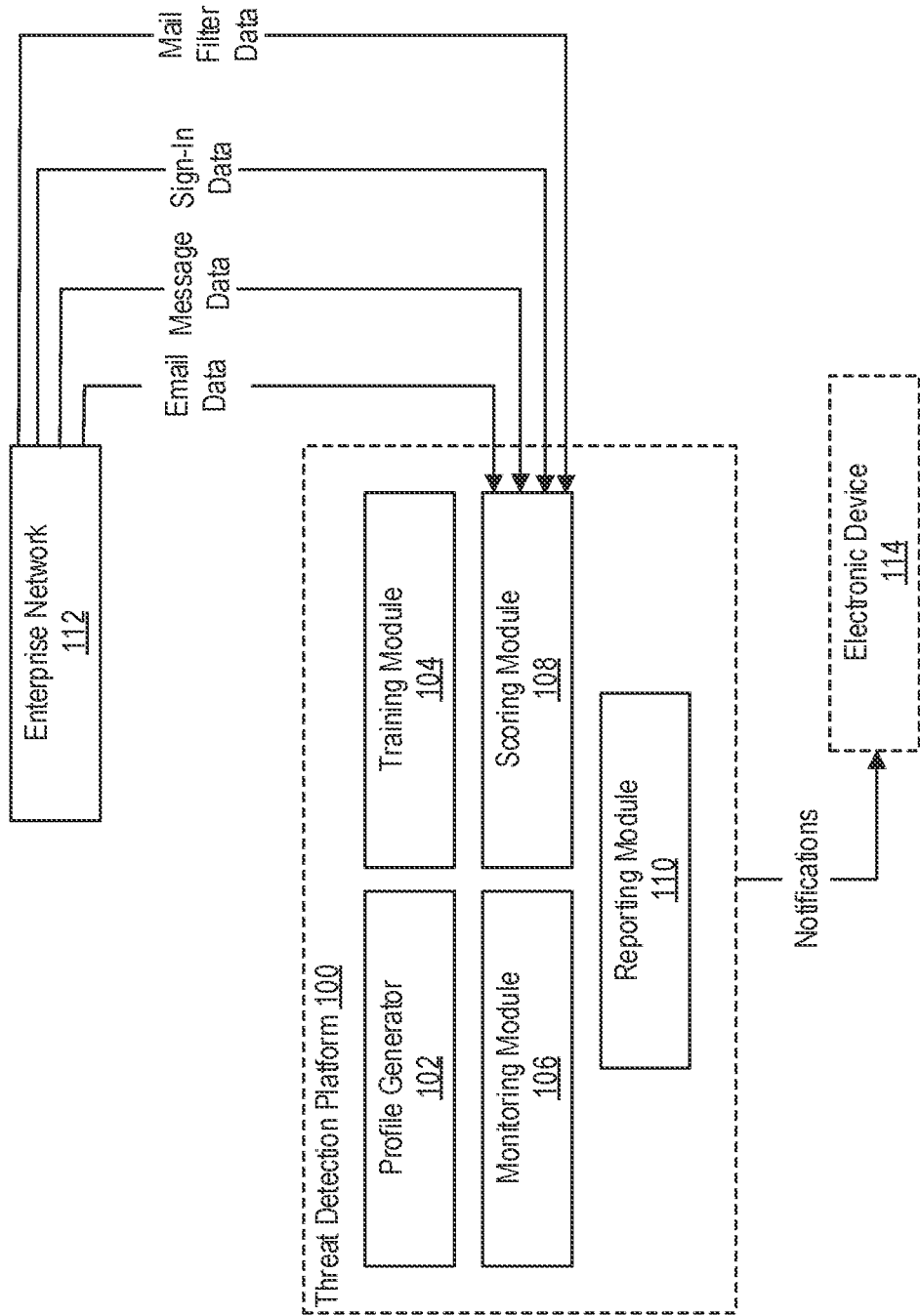
FIG. 1 depicts an example of a threat detection platform that is designed to identify digital communications, such as emails, that may be threats to the security of an enterprise.

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Email account compromise represents one type of business email compromise (BEC) campaign. Traditionally, enterprises have protected themselves against BEC campaigns by employing defenses such as anti-spam filters that quarantine malicious emails, rules that flag emails with extensions similar to the domain of the enterprise, and identification schemes that cause internal emails to be visibly distinguishable from external emails. But these approaches are largely ineffective in discovering instances of email account compromise since the attacks originate from within the enterprise. This is problematic due to the significant threat that email account compromise represents.

To address this issue, some enterprises have begun employing security operations center (SOC) analysts who are responsible for discovering these attacks and then performing the actions necessary to protect those enterprises. For example, upon discovering an email indicative of email account compromise, a SOC analyst may define a rule that is intended to detect similar emails. When asked to triage emails that have been reported by employees as potentially malicious, SOC analysts have traditionally done the following:

Obtain a set of emails reported by employees;

Investigate these emails in a manual manner to decide whether each email is malicious or non-malicious;

For each email determined to be non-malicious, manually alert the reporting employee of the determination; and For each email determined to be malicious, manually discover the entire email campaign, for example, by searching the inboxes of various employees, removing emails delivered as part of the email campaign, and then alerting the reporting employee of the determination. This process is not only burdensome due to the amount of time involved, but is also inconsistent and imprecise due to its reliance on the judgment of SOC analysts. Although some SOC analysts employ tools to help with the aforementioned tasks, the overall process is still prone to errors. Accordingly, there is a need for a product that can partially or entirely replace this labor-intensive process for investigating potential threats.

Introduced here are computer programs and computer-implemented techniques for discovering malicious emails and then remediating the threat posed by those malicious emails in an automated manner. As further discussed below, a threat detection platform (or simply "platform") may monitor a mailbox to which employees of an enterprise are able to forward emails deemed to be suspicious for analysis. This mailbox may be referred to as an "abuse mailbox" or "phishing mailbox." Generally, an abuse mailbox will be associated with a single enterprise whose employees are able to forward emails to an email address (or simply "address") associated with the abuse mailbox. The threat detection platform can examine emails contained in the abuse mailbox and then determine whether any of those emails represent threats to the security of the enterprise. For example, the threat detection platform may classify each email contained in the abuse mailbox as being malicious or non-malicious. Said another way, the threat detection platform may be responsible for verifying whether emails forwarded to the abuse mailbox are safe. Thereafter, the threat detection platform may determine what remediation actions, if any, are appropriate for addressing the threat posed by those emails determined to be malicious. The appropriate remediation actions may be based on the type, count, or risk of malicious emails.

With the abuse mailbox, the threat detection platform may be able to accomplish several goals.

First, the threat detection platform may use the abuse mailbox to retain and then display all emails reported by employees as suspicious. In some embodiments, the abuse mailbox is designed so that the reported emails can be filtered, searched, or queried using the threat detection platform. Additionally, the threat detection platform may be able to parse the reported emails to determine whether any emails have been delivered as part of a campaign. If the threat detection platform determines that a given email was delivered as part of a campaign, the threat detection platform may be able to identify and then extract other emails delivered as part of the campaign from the inboxes of other employees.

Second, the threat detection platform may place judgment on each email forwarded to the abuse mailbox. For example, each reported email could be classified as either malicious or non-malicious. In some embodiments, the abuse mailbox is designed to display the attack type for those reported emails deemed to be malicious. Such an approach ensures that an individual (e.g., a SOC analyst) can readily establish the types of malicious emails being received by employees. Moreover, the threat detection platform can be configured to generate notifications based on the analysis of the reported emails. For example, the threat detection platform may generate an alert responsive to discovering that a reported email was deemed malicious, or the threat detection platform may generate a reminder that includes information regarding a reported email. As further discussed below, the abuse mailbox may persist details of campaigns discovered through the analysis of reported emails. These details may include the targets, content, strategy, and the like.

Third, the threat detection platform may automatically remediate emails deemed to be malicious. Assume, for example, that the threat detection platform discovers that an email reported by an employee was delivered as part of a campaign. In such a situation, the threat detection platform may examine the inboxes of other employees and then extract similar or identical emails delivered as part of the campaign. Additionally or alternatively, the threat detection platform may create a filter that is designed to identify similar or identical emails when applied to inbound emails. The threat detection platform may identify, establish, or otherwise determine the appropriate remediation action(s) based on information that is known about a malicious email. For example, the threat detection platform may prompt an employee to reset a password for a corresponding email account responsive to determining that she opened a malicious email.

Fourth, the threat detection platform may permit individuals (e.g., SOC analysts) to remediate or restore reported emails. In some embodiments, emails contained in the abuse mailbox can be moved into a folder for deletion or deleted permanently. The abuse mailbox may also permit emails to be restored. That is, the threat detection platform may return an email contained in the abuse mailbox to its intended destination upon receiving input indicative of a request to do so. Moreover, the threat detection platform may update—either continually or periodically—the remediation state of individual emails, batches of emails related to campaigns, etc.

The success of an abuse mailbox can be measured in several respects, namely, from the user and performance perspectives. Further information on these perspectives can be found in Table I. Note that the term "user" refers to an individual who interacts with the abuse mailbox (and, more specifically, the emails contained therein) through interfaces generated by the threat detection platform.

TABLE I

Success metrics for the user and performance perspectives.

| User Perspective | Performance Perspective |
| --- | --- |
| User can receive notifications (e.g., in the form of a text message, push notification, or email). For example, a user may receive an indication of reported emails that were deemed malicious (referred to as "passive mode"), or a user may receive an indication of reported emails that were deemed malicious and then remediated (referred to as "active mode"). | User may receive a notification nearly instantaneously after actions are performed by the threat detection platform. For example, the threat detection platform may generate a notification upon rendering a judgment with respect to a reported email or upon performing a remediation action to address the threat posed by a reported email. The threat detection platform may be programmed to generate notifications in the vast majority of cases (e.g., possibly greater than 99% of the time). |
| User may be able to visit the abuse mailbox itself. Upon accessing the abuse mailbox, the user may see reported emails with corresponding judgments. Thus, the user may be able to see the attack types of emails deemed to be malicious. In the active mode, the user may see the remediation state of individual emails or campaigns. Moreover, the user may be able to filter, search, or query the reported emails. For example, the user may specify one or more criteria to locate a campaign of interest. | Information on reported emails may be provided each time that a user accesses the abuse mailbox. Some or all of the reported emails contained in the abuse mailbox may be shown to the user. |
| A user may be able to directly or indirectly access the abuse mailbox. For example, the user may be able to browse the emails contained in the abuse mailbox, or a summary of the contents of the abuse mailbox may be | Remediation actions should not fail to remove emails at issue in normal circumstances. Generally, the time from acknowledgement of a reported email to judgment and then |

TABLE I-continued

Success metrics for the user and performance perspectives.

| User Perspective | Performance Perspective |
|---|---|
| posted to an interface for review by the user. Thus, the user can observe and/or verify emails that have been captured and then remediated. Similarly, the user can observe and/or verify campaigns discovered through an analysis of the reported emails. Moreover, the user may be able to see content of emails (e.g., the subject, the body, the sender address, or a summary of the email itself) and manually remediate or restore emails. | remediation should not take longer than a couple of hours (e.g., 2, 3, or 4 hours). This level of timeliness may be important to ensuring that malicious emails are addressed without introducing significant delay into the investigation process. |

Accordingly, the abuse mailbox may be used as an incident response tool by individuals, such as SOC analysts or other security professionals, to review emails reported by employees as suspicious. By examining these employee-reported emails, email scams such as phishing campaigns and BEC campaigns can be more easily discovered. Thus, the abuse mailbox may be employed by an individual to perform M-SOAR. While email scams are primarily discoverable in external emails, some email scams may be discoverable in internal emails. At a high level, the abuse mailbox is designed to replace or supplement the conventional investigation process in which SOC analysts manually investigate reported emails, for example, by examining employee device data, network telemetry data, threat intelligence data feeds, and the like, and then making a determination about what to do. As an example, SOC analysts may be responsible for specifying what actions should be performed if an employee clicked a link in a malicious email. Moreover, SOC analysts are then responsible for searching the mail tenant to discover whether the same email was received by any other employees. Because each of these steps has historically been manually completed by SOC analysts, the process is slow, time consuming, and inconsistent. For instance, different SOC analysts may investigate different information and/or reach different determinations.

Embodiments may be described in the context of computer-executable instructions for the purpose of illustration. However, aspects of the technology can be implemented via hardware, firmware, or software. As an example, a set of algorithms representative of a computer-implemented model (or simply "model") may be applied to an email contained in the abuse mailbox in order to determine whether the email is malicious. Based on the output produced by the model, the threat detection platform can classify the email based on its likelihood of being a threat and then determine what remediation actions, if any, are necessary to address the threat.

Terminology

References in this description to "an embodiment," "one embodiment," or "some embodiments" mean that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The connection/coupling can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, firmware components, and/or hardware components. Modules are typically functional components that generate data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Threat Detection Platform

FIG. 1 depicts an example of a threat detection platform 100 that is designed to identify digital communications, such as emails, that may be threats to the security of an enterprise. The threat detection platform 100 may include a profile generator 102, training module 104, monitoring module 106, scoring module 108, and reporting module 110. Some embodiments of the threat detection platform 100 include a subset of these components, while other embodiments of the threat detection platform 100 include additional components that are not shown in FIG. 1.

At a high level, the threat detection platform 100 can acquire data related to the digital conduct of accounts associated with employees and then determine, based on an analysis of the data, how to handle threats in a targeted manner. The term "account" may refer to digital profiles with which employees can engage in digital activities. These digital profiles are normally used to perform activities such as exchanging emails and messages, and thus may also be referred to as "email accounts" or "messaging accounts." The term "digital conduct," meanwhile, may refer to the digital activities that are performed with those accounts. Examples of digital activities include transmitting and receiving digital communications, creating, modifying, and deleting filters to be applied to incoming digital communications, initiating sign-in activities, and the like. Examples of digital communications include emails and messages.

As shown in FIG. 1, the data may include information related to emails, messages, mail filters, and sign-in activities. Note that these data are not necessarily obtained from the same source. As an example, data related to emails may be acquired from an email service (e.g., Microsoft Exchange™) while data related to messages may be acquired from a messaging service (e.g., Slack®). Thus, the threat detection platform 100 may be able to identify threats based on an analysis of emails (e.g., the content of the body, the email address of the sender, etc.), metadata accompanying the emails (e.g., information regarding the sender, recipient, origin, time of transmission, etc.), and other suitable data.

The threat detection platform 100 can be implemented, partially or entirely, within an enterprise network 112, a remote computing environment (e.g., through which data regarding digital conduct is routed for analysis), a gateway, or another suitable location. The remote computing environment can belong to, or be managed by, the enterprise or another entity. In some embodiments, the threat detection platform 100 is integrated into the enterprise's email system (e.g., at the gateway) as part of an inline deployment. In other embodiments, the threat detection platform 100 is integrated into the enterprise's email system via an application programming interface (API) such as the Microsoft Outlook® API. In such embodiments, the threat detection platform 100 may obtain data via the API. Thus, the threat detection platform 100 can supplement and/or supplant other security products employed by the enterprise.

In a first variation, the threat detection platform 100 is maintained by a threat service (also referred to as a "security service") that has access to multiple enterprises' data. In this variation, the threat detection platform 100 can route data that is, for example, related to incoming emails to a computing environment managed by the security service. The computing environment may be an instance on Amazon Web Services® (AWS). The threat detection platform 100 may maintain one or more databases for each enterprise that include, for example, organizational charts, attribute baselines, communication patterns, and the like. Additionally or alternatively, the threat detection platform 100 may maintain federated databases that are shared amongst multiple entities. Examples of federated databases include databases specifying vendors and/or individuals who have been deemed fraudulent, domains from which incoming emails determined to represent security threats originated, and the like. The security service may maintain different instances of the threat detection platform 100 for different enterprises, or the security service may maintain a single instance of the threat detection platform 100 for multiple enterprises. The data hosted in these instances can be obfuscated, encrypted, hashed, depersonalized (e.g., by removing personal identifying information), or otherwise secured or secreted. Accordingly, each instance of the threat detection platform 100 may only be able to access/process data related to the accounts associated with the corresponding enterprise(s).

In a second variation, the threat detection platform 100 is maintained by the enterprise whose accounts are being monitored, either remotely or on premises. In this variation, all relevant data may be hosted by the enterprise itself, and any information to be shared across multiple enterprises can be transmitted to a computing system that is maintained by the security service or a third party.

As shown in FIG. 1, the profile generator 102, training module 104, monitoring module 106, scoring module 108, and reporting module 110 can be integral parts of the threat detection platform 100. Alternatively, these components could be implemented individually while operating "alongside" the threat detection platform 100. For example, the reporting module 110 may be implemented in a remote computing environment to which the threat detection platform 100 is communicatively connected across a network. As mentioned above, the threat detection platform 100 may be implemented by a security service on behalf of an enterprise or the enterprise itself. In some embodiments, aspects of the threat detection platform 100 are enabled by a web-accessible computer program operating on a computer server or a distributed computing system. For example, an individual may be able to interface with the threat detection platform 100 through a web browser that is executing on an electronic computing device (also referred to as an "electronic device" or "computing device").

The enterprise network 112 may be a mobile network, wired network, wireless network, or some other communication network maintained by the enterprise or an operator on behalf of the enterprise. As noted above, the enterprise may utilize a security service to examine emails (among other things) to discover potential threats. The enterprise may grant permission to the security service to monitor the enterprise network 112 by examining emails (e.g., incoming emails or outgoing emails) and then addressing those emails that represent threats. For example, the threat detection platform 100 may be permitted to remediate the threats posed by those emails, or the threat detection platform 100 may be permitted to surface notifications regarding the threats posed by those emails. In some embodiments, the enterprise further grants permission to the security service to obtain data regarding other digital activities involving the enterprise (and, more specifically, employees of the enterprise) in order to build a profile that specifies communication patterns, behavioral traits, normal content of emails, etc. For example, the threat detection platform 100 may identify the filters that have been created and/or destroyed by each employee to infer whether any significant variations in behavior have occurred.

The threat detection platform 100 may manage one or more databases in which data can be stored. Examples of such data include enterprise data (e.g., email data, message data, sign-in data, and mail filter data), remediation policies, communication patterns, behavioral traits, and the like. The data stored in the database(s) may be determined by the threat detection platform 100 (e.g., learned from data available on the enterprise network 112), provided by the enterprise, or retrieved from an external database (e.g., associated with LinkedIn®, Microsoft Office 365®, or G Suite™). The threat detection platform 100 may also store outputs produced by the various modules, including machine- and human-readable information regarding insights into threats and any remediation actions that were taken.

As shown in FIG. 1, the threat detection platform 100 may include a profile generator 102 that is responsible for generating one or more profiles for the enterprise. For example, the profile generator 102 may generate a separate profile for each account associated with an employee of the enterprise based on the sign-in data, message data, email data, or mail filter data. Additionally or alternatively, profiles may be generated for business groups, organizational groups, or the enterprise as a whole. By examining the data obtained from the enterprise network 112, the profile generator 102 can discover organizational information (e.g., employees, titles, and hierarchy), employee behavioral traits (e.g., based on historical emails, messages, and historical mail filters), normal content of incoming or outgoing emails, behavioral patterns (e.g., when each employee normally logs in), communication patterns (e.g., who each employee communicates with internally and externally, when each employee normally communicates), etc. This information can be populated into the profiles so that each profile can be used as a baseline for what constitutes normal activity by the corresponding account (or group of accounts).

A profile could include a number of behavioral traits associated with the corresponding account. For example, the profile generator 102 may determine the behavioral traits based on the email data, message data, sign-in data, or mail filter data obtained from the enterprise network 112. The email data may include information on the senders of past emails received by a given email account, content of those past emails, frequency of those past emails, temporal patterns of those past emails, topics of those past emails, geographical location from which those past emails originated, formatting characteristics (e.g., usage of HTML, fonts, styles, etc.), and more. Thus, the profile generator 102 may attempt to build a profile for each email account that represents a model of normal behavior of the corresponding employee. As further discussed below, the profiles may be helpful in identifying digital activities and communications that indicate that a threat to the security of the enterprise may exist.

The monitoring module 106 may be responsible for monitoring communications (e.g., messages and emails) handled by the enterprise network 112. These communications may include inbound emails (e.g., external and internal emails) received by accounts associated with employees of the enterprise, outbound emails (e.g., external and internal emails) transmitted by those accounts, and messages exchanged between those accounts. In some embodiments, the monitoring module 106 is able to monitor inbound emails in near real time so that appropriate action can be taken if a malicious email is discovered. For example, if an inbound email is found to be similar to one that the threat detection platform 100 determined was delivered as part of a phishing campaign of a BEC campaign (e.g., based on an output produced by the scoring module 108), then the inbound email may be prevented from reaching its intended destination by the monitoring module 106 at least temporarily. In some embodiments, the monitoring module 106 is able to monitor communications only upon the threat detection platform 100 being granted permission by the enterprise (and thus given access to the enterprise network 112).

The scoring module 108 may be responsible for examining digital activities and communications to determine the likelihood that a security threat exists. For example, the scoring module 108 may examine emails forwarded by employees to an abuse mailbox to determine whether those emails were delivered as part of an email scam, as further discussed below. As another example, the scoring module 108 may examine each incoming email to determine how its characteristics compare to past emails received by the intended recipient. In such embodiments, the scoring module 108 may determine whether characteristics such as timing, formatting, and location of origination (e.g., in terms of sender email address or geographical location) match a pattern of past emails that have been determined to be non-malicious. For instance, the scoring module 108 may determine that an email is likely to be malicious if the sender email address (support-xyz@gmail.com) differs from an email address (John.Doe@CompanyABC.com) that is known to be associated with the alleged sender (John Doe). As another example, the scoring module 108 may determine that an account may have been compromised if the account performs a sign-in activity that is impossible or improbable given its most recent sign-in activity.

The scoring module 108 can make use of heuristics, rules, neural networks, or other trained machine learning (ML) algorithms such as decision trees (e.g., gradient-boosted decision trees), logistic regression, and linear regression. Accordingly, the scoring module 108 may output discrete outputs or continuous outputs, such as a probability metric (e.g., specifying the likelihood that an incoming email is malicious), a binary output (e.g., malicious or non-malicious), or a classification (e.g., specifying the type of malicious email).

The reporting module 110 may be responsible for reporting insights derived from the outputs produced by the scoring module 108. For example, the reporting module 110 may provide a summary of the emails contained in an abuse mailbox that have been examined by the scoring module 108 to an electronic device 114. The electronic device 114 may be managed by the employee associated with the account under examination, an individual associated with the enterprise (e.g., a member of the information technology department), or an individual associated with a security service. As another example, the reporting module 110 may transmit a notification to the electronic device 114 responsive to a determination that an email contained in the abuse mailbox is malicious (e.g., based on an output produced by the scoring module 108). As further discussed below, the reporting module 110 can surface this information in a human-readable format for display on an interface accessible via the electronic device 114.

Some embodiments of the threat detection platform 100 also include a training module 104 that operates to train the models employed by the other modules. For example, the training module 104 may train the models applied by the scoring module 108 to the email data, message data, sign-in data, and mail filter data by feeding training data into those models. The training data could include emails that have been labeled as malicious or non-malicious, policies related to attributes of emails (e.g., specifying that emails originating from certain domains should not be considered malicious), etc. The training data may be employee- or enterprise-specific so that the model(s) are able to perform personalized analysis. In some embodiments, the training data ingested by the model(s) includes emails that are known to be representative of malicious emails sent as part of an attack campaign. These emails may have been labeled as such during a training process, or these emails may have been labeled as such by other employees.

Overview of Abuse Mailbox

To facilitate the discovery of email scams, employees of an enterprise may be instructed to forward suspicious emails to an address associated with a mailbox. This mailbox may be referred to as an "abuse mailbox" or "phishing mailbox." In some embodiments, the abuse mailbox is associated with an address with which only addresses corresponding to a domain associated with the enterprise are permitted to communicate. As further discussed below, a threat detection platform may monitor the mailbox and then examine emails forwarded thereto by employees.

Assume, for example, that the threat detection platform discovers that an email is located in the abuse mailbox. In such a situation, the threat detection platform may apply one or more models to the email and then determine, based on outputs produced by those models, whether the email is representative of a threat to the security of the enterprise. The threat detection platform can then take several steps to address the threat. For example, the threat detection platform may examine inboxes associated with other employees to determine whether the email was delivered as part of an email scam. If the threat detection platform discovers additional instances of the email, then those additional instances can be removed from the corresponding inboxes. Additionally or alternatively, the threat detection platform may generate a notification regarding the email. This notification may be sent to, for example, the employee responsible for forwarding the email to the abuse mailbox or a security professional employed by the enterprise or a security service.

Figure 2:
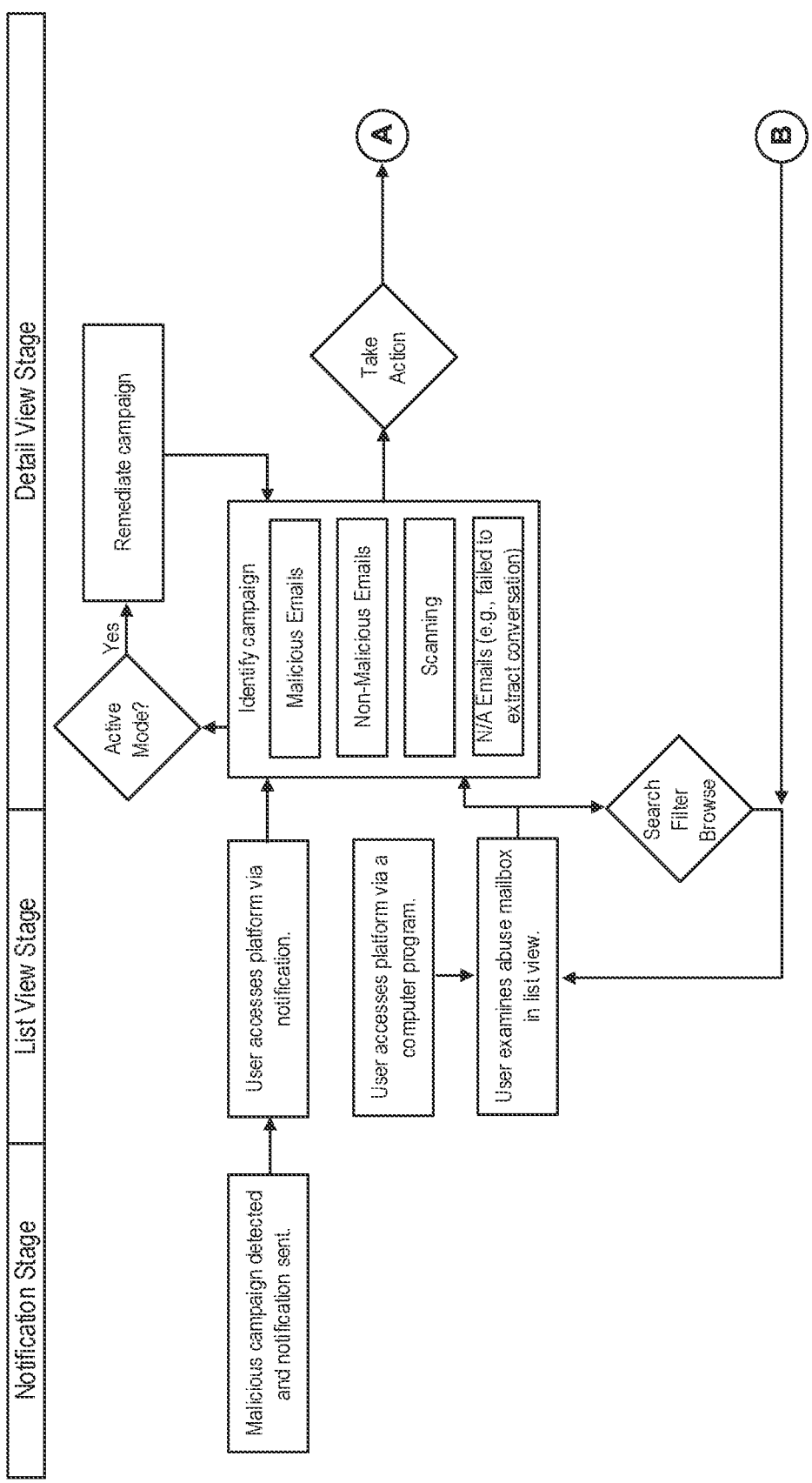
FIG. 2 includes a high-level illustration of a user workflow for interacting with an abuse mailbox.

FIG. 2 includes a high-level illustration of a user workflow for interacting with an abuse mailbox. As mentioned above, the term "user" refers to an individual who interacts with the abuse mailbox (and, more specifically, the emails contained therein) through interfaces generated by the threat detection platform. Examples of users include SOC analysts and other security professionals.

In a first case, a first user discovers that an email has been reported by an employee by being forwarded to the abuse mailbox. The first user visits the abuse mailbox and then identifies an appropriate remediation action for addressing a threat posed by the email. Thus, the first user may specify, through the threat detection platform, how to address the threat posed by the email. Note that while the first user may be described as accessing the abuse mailbox, the first user may actually access an interface that summarizes the content of the abuse mailbox rather than the abuse mailbox itself.

In a second case, a second user receives a notification from the threat detection platform that serves as an alert that an email contained in the abuse mailbox was determined to be malicious and then remediated. The second user can then complete the remainder of the workflow, as appropriate.

In a third case, a third user visits the abuse mailbox to verify that a campaign of malicious emails has been appropriately remediated. As discussed above, when in an "active mode," the threat detection platform may automatically discover and then remediate email scams. For example, upon determining that an email forwarded by an employee to the abuse mailbox is malicious, the threat detection platform can examine the inboxes of other employees to determine whether the email was delivered as part of an email scam. The term "email scam," as used herein, refers to a coordinated campaign in which multiple emails—usually similar or identical in content—are delivered to multiple recipients (e.g., multiple employees of a single enterprise). If the threat detection platform discovers additional instances of the email, those additional instances can be moved into a junk folder or deleted folder or permanently deleted.

As shown in FIG. 2, the first, second, and third users can access the abuse mailbox via a computer program. Examples of computer programs include mobile applications, desktop applications, over-the-top (OTT) applications, and web browsers. Alternatively, the first, second, and third users can access the abuse mailbox via a notification generated by the threat detection platform. For example, the threat detection platform may generate a notification responsive to determining that a predetermined number of emails (e.g., 1, 10, or 50) are contained in the abuse mailbox. This notification may allow a given user, using an electronic device, to access the threat detection platform to manage the abuse mailbox.

From a technical standpoint, the abuse mailbox in combination with the threat detection platform can be said to:
- Support live viewing, searching, and aggregating of emails. Employees may be able to readily forward suspicious emails or suspected attacks to the abuse mailbox, and the threat detection platform can be configured to process those emails within a reasonable amount of time (e.g., within several hours).
- Support automatic remediation of individual malicious emails and email scams corresponding to batches of malicious emails.
- Permit remediation of false negatives by allowing non-malicious emails to be returned, either automatically or manually, to their intended destination. If an email is incorrectly judged by an employee, the email can be moved to a predetermined location (e.g., the inbox of the employee or a dedicated folder such as a junk folder).

Figure 3:
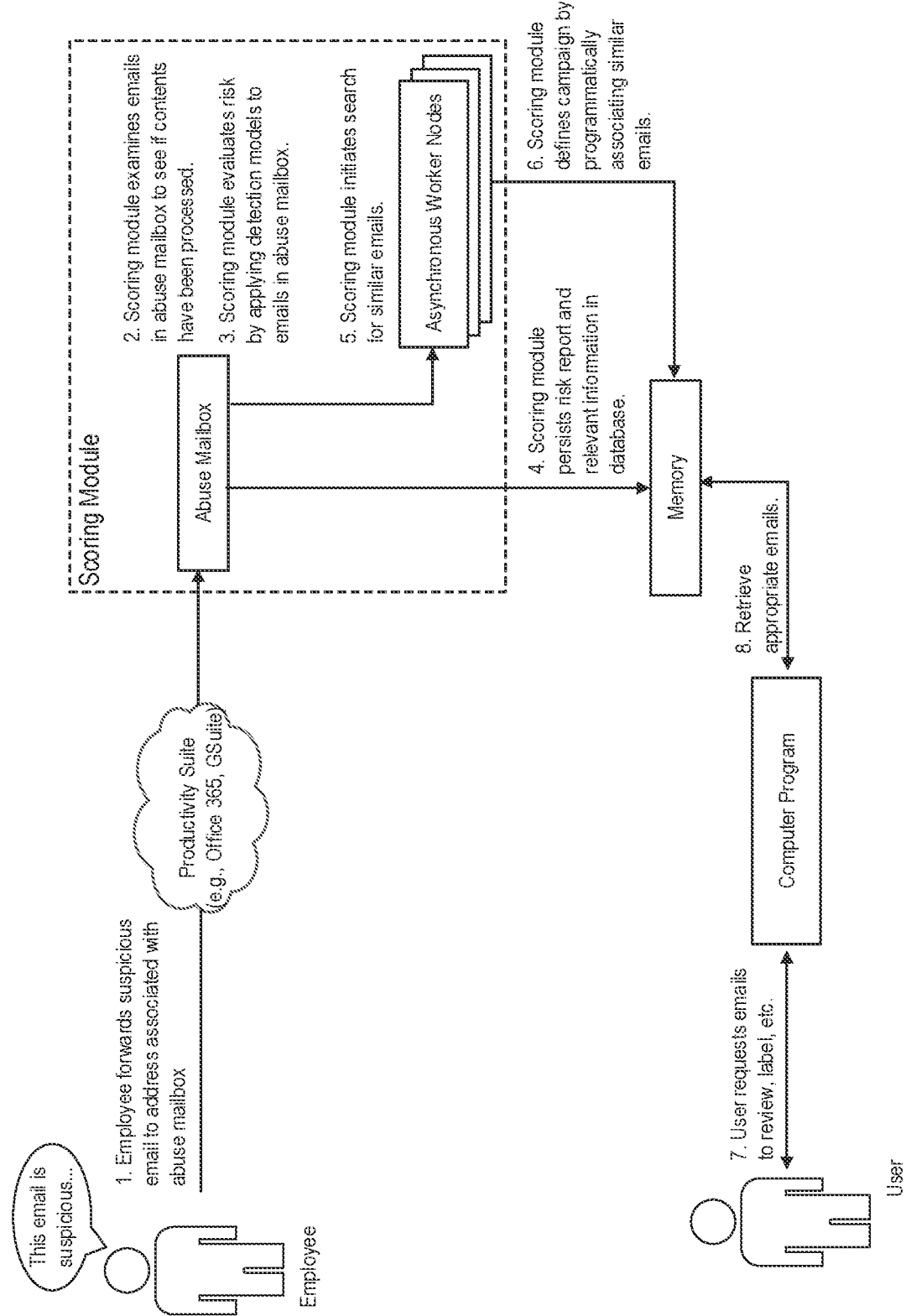
FIG. 3 includes a high-level illustration of another user workflow for utilizing an abuse mailbox.

FIG. 3 includes a high-level illustration of another user workflow for utilizing an abuse mailbox. As discussed above, the abuse mailbox is designed to work in concert with the threat detection platform to mimic aspects of the manual investigation process that has traditionally been performed by SOC analysts. For example, the abuse mailbox may be implemented by a scoring module (e.g., scoring module 108 of FIG. 1) that is executed by a threat detection platform (e.g., threat detection platform 100 of FIG. 1). At a high level, the abuse mailbox supports or facilitates three core features.

First, the abuse mailbox can serve as a "queue" in which emails deemed suspicious by employees can be held for examination. Generally, the threat detection platform (and, more specifically, the scoring module) is configured to process emails in a continual manner, for example, as those emails arrive in the abuse mailbox. Such an approach allows the emails to be processed within a reasonable amount of time (e.g., within several hours). However, in some embodiments, the threat detection platform is configured to process emails in an ad hoc manner. In such embodiments, the threat detection platform may retrieve and/or examine emails in the abuse mailbox responsive to receiving input indicative of a request to do so (e.g., from a user via an interface).

Second, by examining emails contained in the abuse mailbox, the threat detection platform can autonomously discover emails that are identical or similar to reported emails. This allows the threat detection platform to more easily discover campaigns and then take appropriate remediation actions. Assume, for example, that the threat detection platform determines an email contained in the abuse mailbox is malicious. In this situation, the threat detection platform can examine inboxes in an effort to search for other emails that are identical or similar in terms of content, attributes, etc. The threat detection platform can then define these emails as being part of a campaign by programmatically linking them together. Moreover, the threat detection platform can take appropriate remediation actions if those emails are deemed to be malicious. For example, the threat detection platform may permanently delete those emails so as to prevent any further interaction with the campaign. As another example, the threat detection platform may move those emails into junk folders in the respective inboxes responsive to determining that the emails are representations of spam rather than a malicious campaign.

Third, the abuse mailbox may permit users to manually search, move, or remediate emails as needed. For example, a user may browse the emails contained in the abuse mailbox through an interface generated by a computer program. The computer program may be representative of an aspect of the threat detection platform (e.g., reporting module 110 of FIG. 1) or the threat detection platform itself. As another example, a user may provide input through an interface generated by the threat detection platform that specifies a given email should be moved out of the abuse mailbox (e.g., because it has been incorrectly classified as malicious).

FIGS. 4A-B include examples of interfaces that show how information regarding emails contained in the abuse mailbox can be conveyed to users. In FIG. 4A, the interface is representative of a summary of the contents of the abuse email. This summary includes information on the employee responsible for reporting each email, the judgment rendered by the threat detection platform regarding the risk posed by each email, and whether the email was delivered as part of a campaign. While six records corresponding to six different emails are shown, only one was delivered as part of a campaign. As can be seen in FIG. 4A, the email delivered as part of a campaign includes multiple recipients listed in the appropriate column.

In FIG. 4B, the interface is representative of a record for an email determined to be part of a campaign. The record includes several tabs, including a summary tab, an email body tab, and an email header tab. Each of these tabs includes information regarding the email and campaign itself. In FIG. 4B, information regarding the email contained in the abuse mailbox is presented in a first pane while information regarding other emails that were delivered as part of the campaign is presented in a second pane. This approach allows a user to easily digest information regarding individual emails and campaigns (e.g., by identifying who was targeted, whether the emails have been moved or deleted, etc.). Moreover, this interface may permit the user to manually perform actions with respect to the email under review. For example, upon selecting the graphical element shown in the upper-left corner, the user may be able to specify that the email should be returned to its original location (e.g., the inbox of the reporting employee), moved to another location (e.g., a junk folder in the inbox of the reporting employee), or permanently deleted.

Figure 5:
FIG. 5 includes an example of a notification that may be generated to alert a user of a state of the abuse mailbox or an action taken by the threat detection platform.

FIG. 5 includes an example of a notification that may be generated to alert a user of a state of the abuse mailbox or an action taken by the threat detection platform. While the notification shown here is in the form of an email, those skilled in the art will recognize that the notification could take other forms. For example, the notification may be surfaced via a text message delivered to a phone number associated with the user, or the notification may be surfaced via a push notification generated by a computer program (e.g., a mobile application or desktop application) executing on a computing device associated with the user.

In some embodiments, notifications are sent in near real time. That is, a notification may be generated proximate to the time at which the event prompting the notification occurs. For example, the user may be alerted immediately after an email arrives in the abuse mailbox, immediately after a determination has been made regarding risk of the email, or immediately after a remediation action has been performed. In other embodiments, notifications are sent on a periodic basis. For example, the threat detection platform may queue notifications for delivery at a predetermined time (e.g., every morning at 7 AM), or the threat detection platform may queue notifications for delivery until a predetermined number of notifications have been generated (e.g., 3 or 5).

User Workflow

Figure 6A:
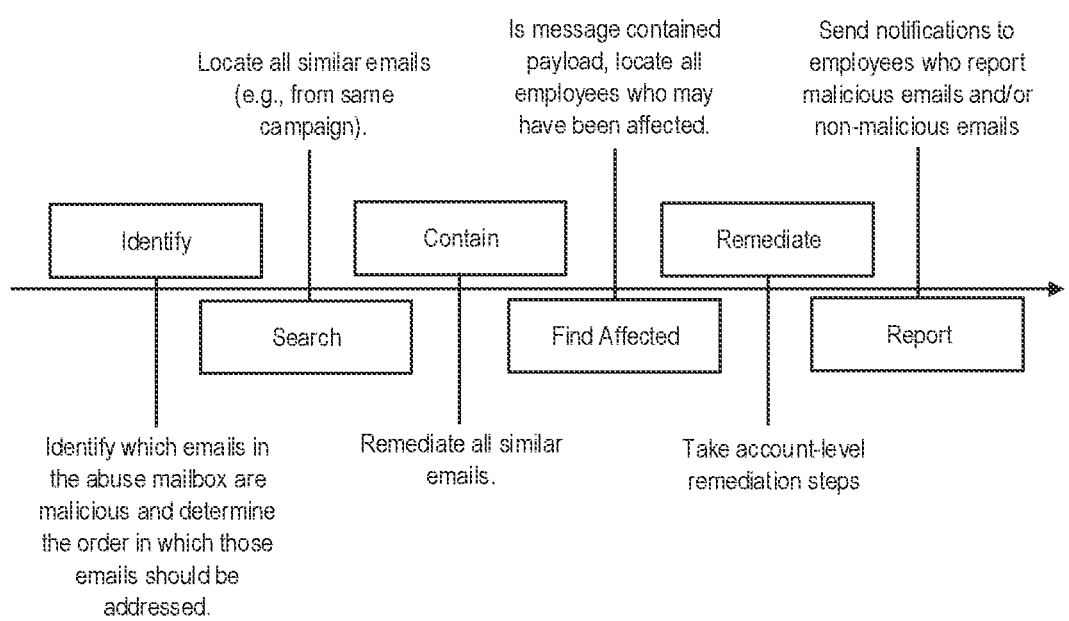
FIGS. 6A-B include a high-level illustration of an investigation process by which campaigns of malicious emails are discovered and then addressed.
Figure 6B:
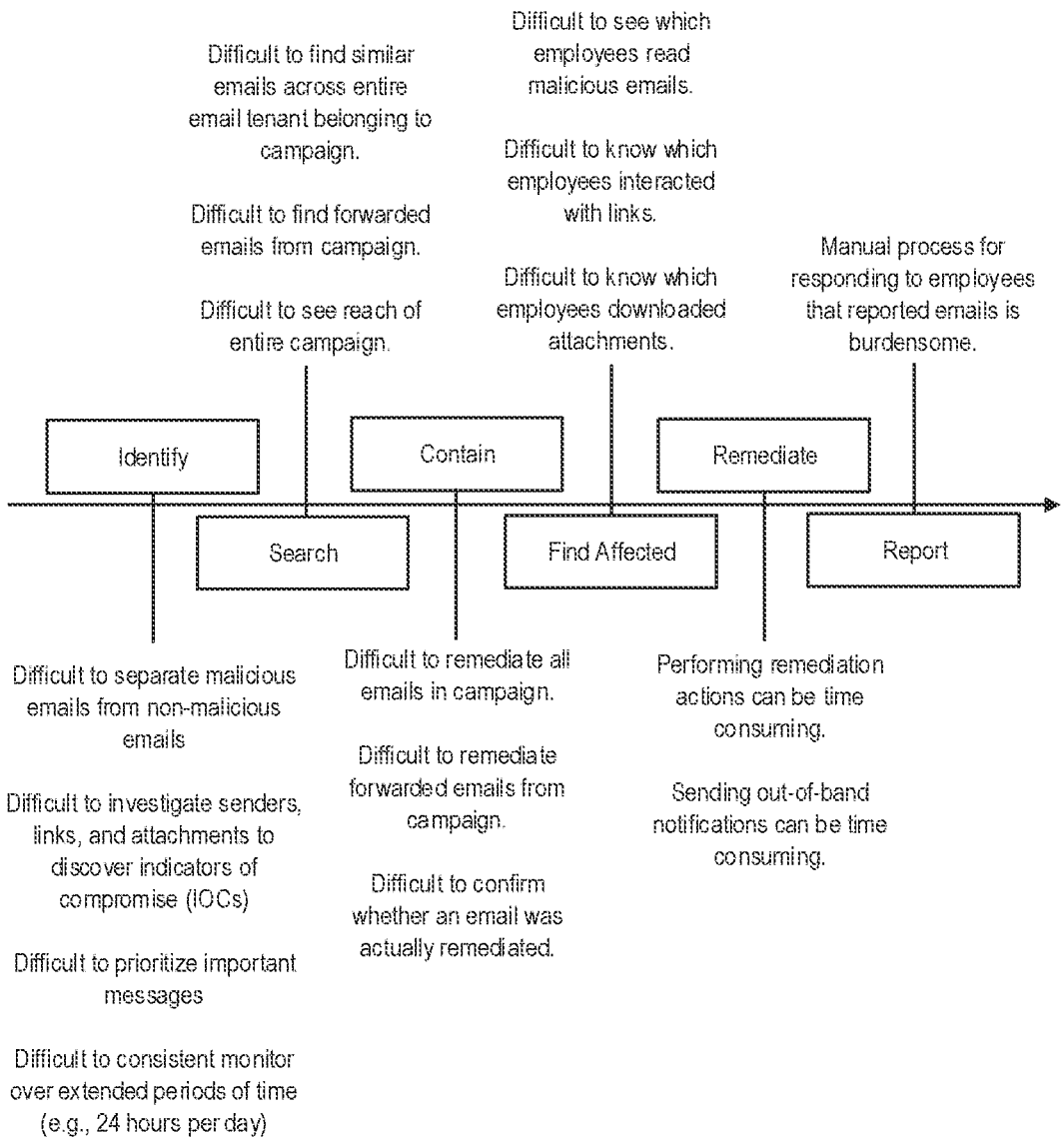

FIGS. 6A-B include a high-level illustration of an investigation process by which campaigns of malicious emails are discovered and then addressed. In FIG. 6A, each step of the investigation process is described, while some drawbacks of conventional approaches are shown in FIG. 6B. As discussed above, these drawbacks largely relate to the manual performance of these steps by SOC analysts, which causes the investigation process to be inconsistent and prone to errors.

The technology described herein addresses these drawbacks. As discussed above, the threat detection platform may have additional insight into the digital conduct of employees. Because the threat detection platform is not solely looking at the content and characteristics of inbound external emails, the threat detection platform is able to establish whether malicious emails were forwarded within an enterprise network and what actions were taken upon receipt of those malicious emails.

Figure 7:
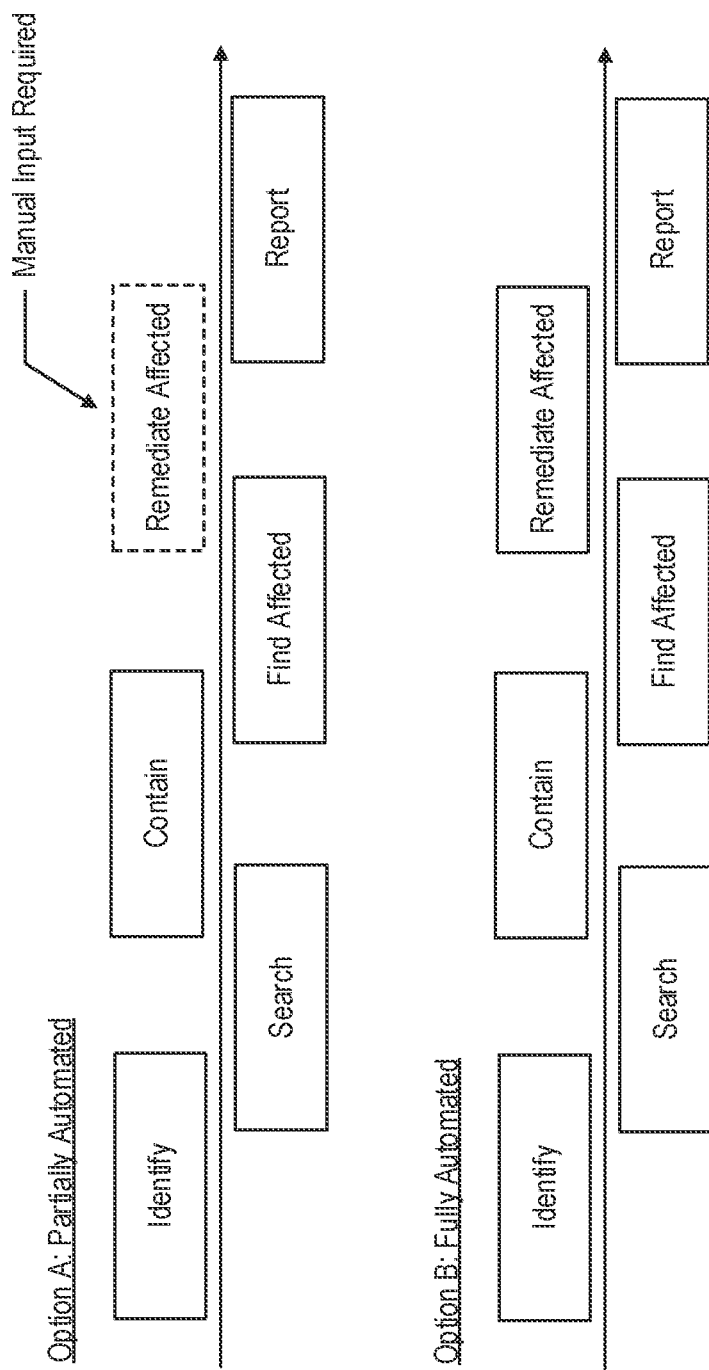
FIG. 7 includes high-level illustrations of two approaches to improving the investigation process.

While each of these phases can be automated, there are two main embodiments: one in which the investigation process is fully automated and one in which the investigation process is partially automated. These approaches are shown in FIG. 7. The most notable difference between these approaches is the degree to which remediation is automatically performed by the threat detection platform. Note that while one approach is described as "fully automated," the threat detection platform does not necessarily prevent a user from modifying or taking actions to remediate threats. Instead, the approach described as "partially automated" may rely on a user to either specify the appropriate remediation actions or confirm remediation actions recommended by the threat detection platform prior to performance.

Figure 8:
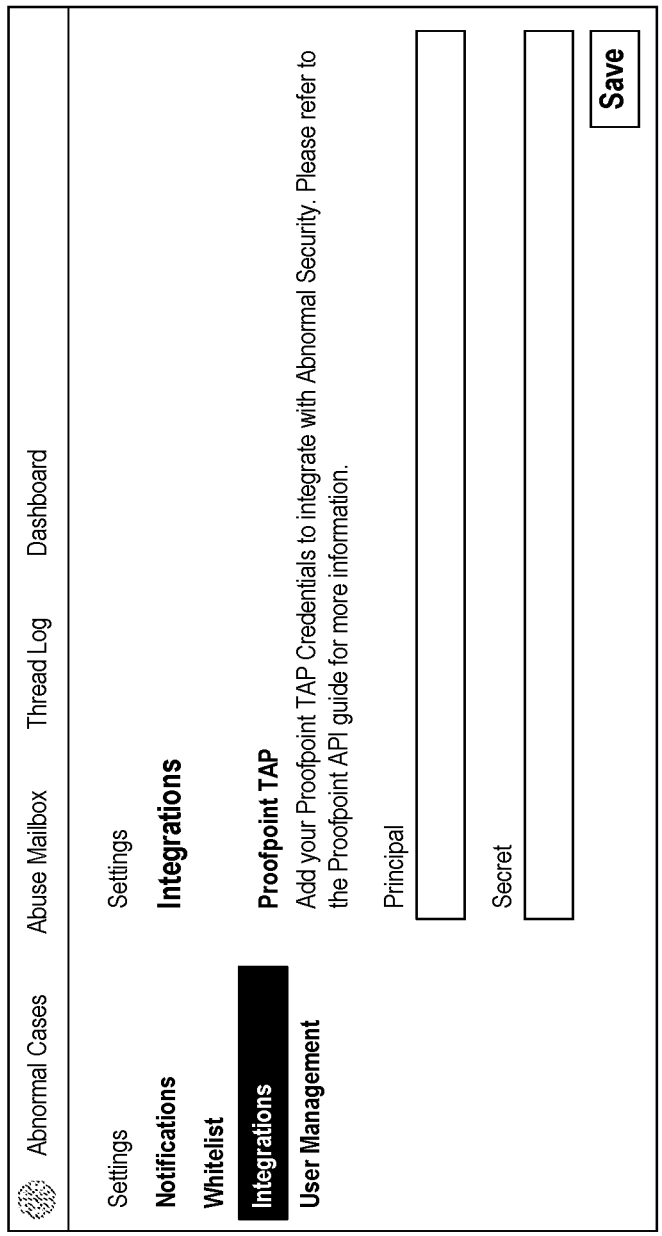
FIG. 8 illustrates how the threat detection platform can be integrated into other security tools to better protect an enterprise against threats.

In some embodiments, users may be interested in further integrating the threat detection platform into the suite of security tools employed to protect an enterprise against threats. As an example, a user may want to allow the threat security platform to access Proofpoint® APIs in order to provide enriched detection and remediation efficacy. By integrating with Proofpoint® Targeted Attack Protection (TAP), for example, the user can provide the threat detection platform an additional source from which to ingest information regarding threats. The threat detection platform can orchestrate and then perform remediation actions to address malicious emails, further reduce the amount of manual labor needed to complete the investigation process, and improve detection efficacy by learning about malicious emails that are caught by Proofpoint® TAP. As shown in FIG. 8, integration may be a straightforward process. After accessing an interface through which integrations can be requested, a user can input credentials for Proofpoint® TAP.

The threat detection platform can then automatically integrate with Proofpoint® TAP through its Security Information and Event Management (SIEM) API in order to periodically obtain emails that are representative of threats. As shown in FIG. 9, these emails may be presented within the abuse mailbox as a separate source. Thus, a user may be permitted to browse emails forwarded by employees and/or filtered by Proofpoint® TAP.

Methodologies for Discovering Malicious Emails and Scams

Figure 10:
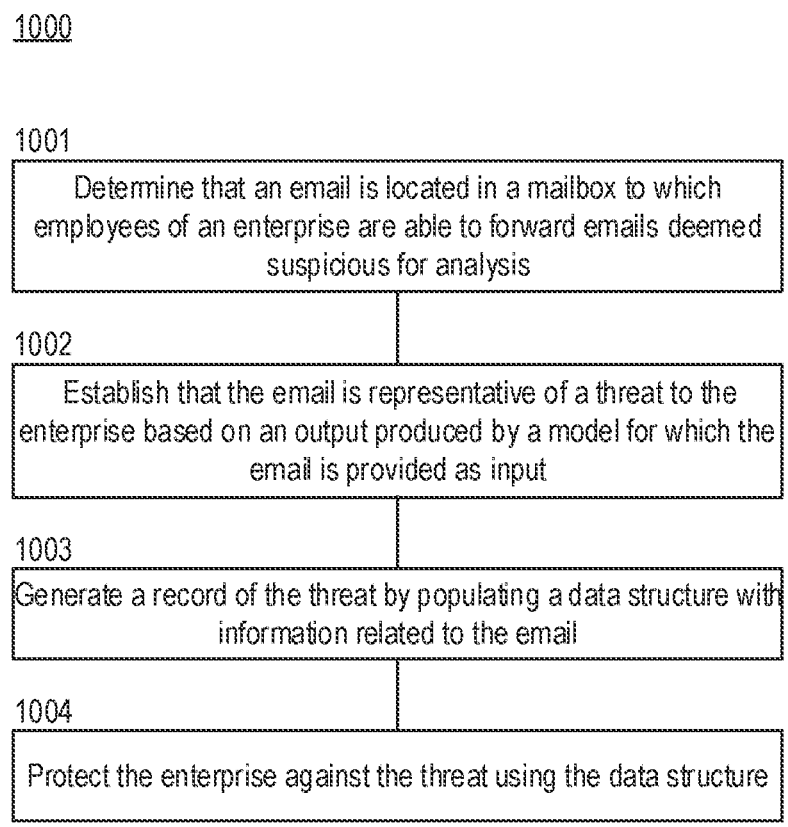
FIG. 10 includes a flow diagram of a process for protecting an enterprise against threats based on emails forwarded to an abuse mailbox.

FIG. 10 includes a flow diagram of a process 1000 for protecting an enterprise against threats based on emails forwarded to an abuse mailbox. As noted above, these emails are generally forwarded by employees of an enterprise, though these emails could also be forwarded by another security tool (e.g., Proofpoint® TAP).

Initially, a threat detection platform can determine that an email is contained in the abuse mailbox to which employees are able to forward emails deemed suspicious for analysis (step 1001). In some embodiments, the threat detection platform continually monitors the contents of the abuse mailbox or periodically checks the contents of the abuse mailbox. In other embodiments, the threat detection platform is notified (e.g., by a controller) when emails are received by the abuse mailbox.

Then, the threat detection platform can determine whether the email is representative of a threat to the enterprise by applying one or more models thereto. In some situations, the threat detection platform will establish that the email is representative of a threat based on the output(s) produced by the model(s) (step 1002). Thereafter, the threat detection platform can generate a record of the threat by populating a data structure with information related to the email (step 1003). This information can include the sender identity, sender domain, sender address, geographical origin, subject, threat type, target, or any combination thereof. Additional examples of such information can be seen in the interfaces shown in FIGS. 4A-B. This information may be extracted from the email or its accompanying metadata. The threat detection platform may store this record in a database in which threats are systematically logged over time. The database may include a series of records, each of which corresponds to a different email forwarded to the abuse mailbox.

The record of the threat can be used in several different ways to protect the enterprise. As an example, the threat detection platform may protect the enterprise against the threat (step 1004) by (i) applying the data structure to inboxes of the employees to determine whether the email was delivered as part of a campaign and/or (ii) applying the data structure as a filter to inbound emails addressed to the employees. Thus, the record may be used to remediate past threats and protect against future threats. If the threat detection platform discovers, in the inboxes of the employees, a series of emails that are similar or identical to the email at issue, then the threat detection platform can define a campaign by programmatically associating these email messages with one another.

Note that, in some embodiments, the abuse mailbox is designed to be browsable and searchable. Thus, the threat detection platform may generate an interface through which a user is able to examine the contents of the abuse mailbox, as well as any determinations made as to the risk of the emails contained therein. If the threat detection platform receives input indicative of a query that specifies a criterion, the threat detection platform may search the abuse mailbox to identify emails that satisfy the criterion and then present those emails for display on an interface. Similarly, the threat detection platform may use the criterion to search the database of records corresponding to emails that were deemed malicious. The criterion could be, for example, a sender identity, sender domain, sender address, threat type, target, or timeframe.

FIG. 11 includes a flow diagram of a process 1100 for identifying and then remediating BEC campaigns. Initially, a threat detection platform can determine that a first email has been forwarded by a first employee of an enterprise to an abuse mailbox for analysis (step 1101). Step 1101 of FIG. 11 may be substantially similar to step 1001 of FIG. 10.

Thereafter, the threat detection platform can establish that the first email message was delivered as part of a BEC campaign (step 1102). For example, the threat detection platform may apply a first model to the first email to produce a first output that indicates a likelihood of the first email being malicious. This first model may consider features such as the header, body, sender identity, sender address, geographical origin, time of transmission, etc. If the first output indicates that the first email is malicious, then the threat detection platform may apply a second model to the first email to produce a second output that indicates the type of malicious email.

The threat detection platform can then examine an inbox associated with a second employee of the enterprise to identify a second email that was delivered as part of the BEC campaign (step 1103). The second employee may be one of multiple employees whose inboxes are searched by the threat detection platform. For example, the threat detection platform could examine the inboxes of all employees of the enterprise, or the threat detection platform could examine the inboxes of only some employees of the enterprise (e.g., those included in a group or department that appears to have been targeted).

The threat detection platform can remediate the BEC campaign in an automated manner by extracting the second email from the inbox so as to prevent further interaction with the second email by the second employee (step 1104). As discussed, the threat detection platform may also generate a record of the BEC campaign by populating a data structure with information related to the first and second emails. In such embodiments, the threat detection platform may apply the data structure to inbound emails addressed to employees of the enterprise so as to filter emails related to the BEC campaign prior to receipt by the employees. Thus, the threat detection platform may use information learned about the BEC campaign to remediate past threats and protect against future threats.

In some embodiments, the threat detection platform is further configured to notify a user of the threat posed by the BEC campaign (step 1105). For example, the threat detection platform may extract or derive information regarding the BEC campaign from the first and second emails, generate a report summarizing the threat posed by the BEC campaign that includes the information, and then provide the report to the user. This report may be provided to the user in the form of a visualization component that is rendered on an interface generated by the threat detection platform.

FIG. 12 includes a flow diagram of a process 1200 for automatically remediating a threat posed by an email scam (or simply "scam"). Initially, a threat detection platform can examine an email forwarded to an abuse mailbox by an employee of an enterprise for analysis (step 1201). To accomplish this, the threat detection platform may examine the email and its accompanying metadata. More specifically, the threat detection platform may provide information extracted or derived from the email and its accompanying metadata to a model as input. The model may be designed to produce an output that indicates whether the email was delivered as part of a scam. Thus, the threat detection platform may determine, based on the output, that the email was delivered as part of a scam (step 1202). The threat detection platform may perform a remediation action (or simply "action") to automatically remediate the threat posed by the scam (step 1203). These steps may be performed in real time as emails are forwarded to the abuse mailbox by employees of the enterprise. This streamlined approach ensures that determinations as to threat can be made within a reasonable amount of time (e.g., within several hours of receiving the email in the abuse mailbox).

As discussed above, some emails forwarded to the abuse mailbox may ultimately be deemed non-malicious. Assume, for example, that the threat detection platform examines a second email forwarded to the mailbox by a second employee of the enterprise for analysis (step 1204) and then determines that the second email does not pose a threat to the enterprise (step 1205). In such a situation, the threat detection platform may move the second email to the inbox associated with the second employee (step 1206). Thus, the threat detection platform may move the second email to its original (and intended) destination responsive to determining that it is not malicious.

Unless contrary to possibility, these steps could be performed in various sequences and combinations. For example, a threat detection platform may be designed to simultaneously monitor multiple abuse mailboxes associated with different enterprises. As another example, a threat detection platform may be programmed to generate notifications for delivery along multiple channels. For instance, upon determining that an email contained in an abuse mailbox is malicious, the threat detection platform may transmit notifications indicating the same via text and email. Other steps could also be included in some embodiments. Assume, for example, that the threat detection platform determines an email contained in an abuse mailbox is malicious and then discovers that the email originated from an account associated with an employee. In such a situation, all digital activities performed with the account could be scored in order to determine the likelihood that it is compromised.

For example, upon establishing that an email forwarded to the abuse mailbox is malicious, the threat detection platform may notify a user who is responsible for monitoring the security of the enterprise. Further information on scoring digital activities can be found in Patent Cooperation Treaty (PCT) Application No. PCT/US2019/67279, titled "Threat Detection Platforms for Detecting, Characterizing, and Remediating Email-Based Threats in Real Time," which is incorporated by reference herein in its entirety.

Processing System

Figure 13:
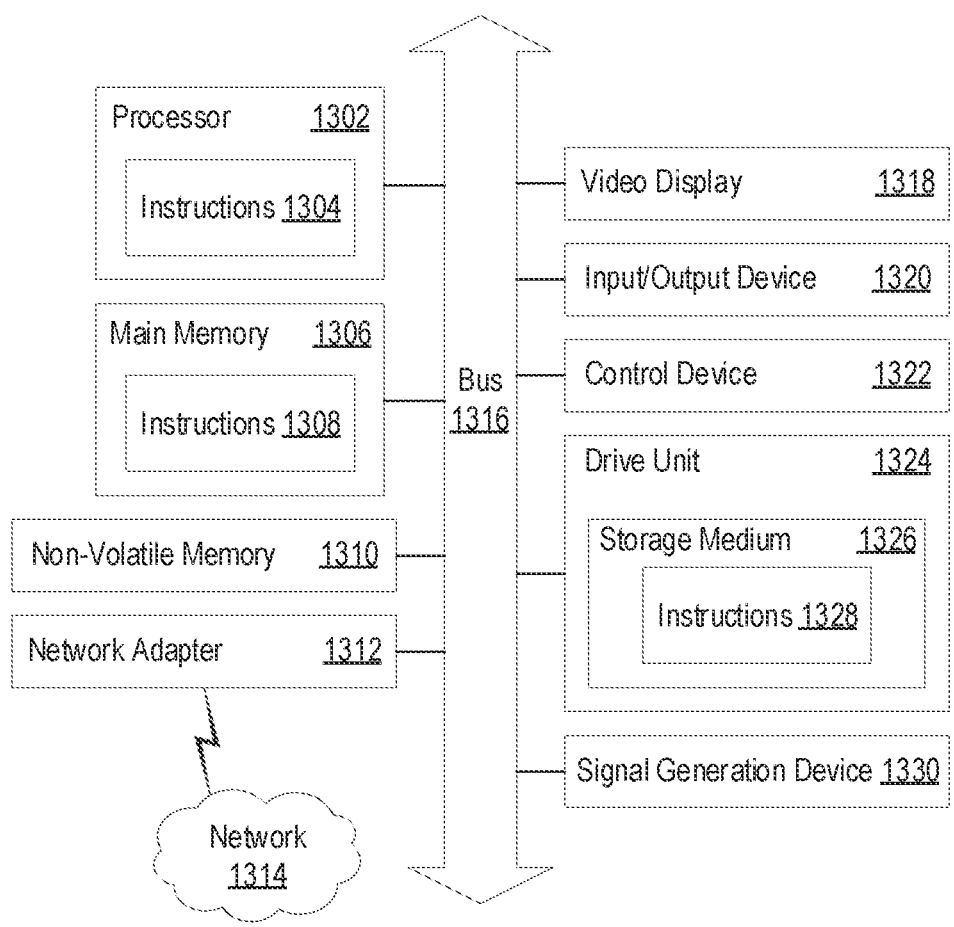
FIG. 13 is a block diagram illustrating an example of a processing system in which at least some operations described herein can be implemented.

FIG. 13 is a block diagram illustrating an example of a processing system 1300 in which at least some operations described herein can be implemented. For example, components of the processing system 1300 may be hosted on a computing device that includes a threat detection platform. As another example, components of the processing system 1300 may be hosted on a computing device that is queried by a threat detection platform to acquire emails, data, etc.

The processing system 1300 may include one or more central processing units ("processors") 1302, main memory 1306, non-volatile memory 1310, network adapter 1312 (e.g., a network interface), video display 1318, input/output devices 1320, control device 1322 (e.g., a keyboard or pointing device), drive unit 1324 including a storage medium 1326 and signal generation device 1330 that are communicatively connected to a bus 1316. The bus 1316 is illustrated as an abstraction that represents one or more physical buses or point-to-point connections that are connected by appropriate bridges, adapters, or controllers. The bus 1316, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC ($I^2C$) bus, or an Institute of Electrical and Electronics Engineers (IEEE) standard 1394 bus (also referred to as "Firewire").

The processing system 1300 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1300.

While the main memory 1306, non-volatile memory 1310, and storage medium 1326 are shown to be a single medium, the terms "machine-readable medium" and "storage medium" should be taken to include a single medium or multiple media (e.g., a centralized/distributed database and/or associated caches and servers) that store one or more sets of instructions 1328. The terms "machine-readable medium" and "storage medium" shall also be taken to include any medium that is capable of storing, encoding, or carrying a set of instructions for execution by the processing system 1300.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memory and storage devices in an electronic device. When read and executed by the processors 1302, the instruction(s) cause the processing system 1300 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 1310, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1312 enables the processing system 1300 to mediate data in a network 1314 with an entity that is external to the processing system 1300 through any communication protocol supported by the processing system 1300 and the external entity. The network adapter 1312 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

The network adapter 1312 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications (e.g., to regulate the flow of traffic and resource sharing between these entities). The firewall may additionally manage and/or have access to an access control list that details permissions including the access and operation rights of an object by an individual, a machine, or an application, and the circumstances under which the permission rights stand.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method, comprising:
    establishing, by a processor via an application programming interface, a connection with an email system employed by an enterprise;
    monitoring, by the processor via the application programming interface, a mailbox to which employees of the enterprise are able to forward emails deemed suspicious for analysis;
    in response to a determination that a first email is located in the mailbox, establishing, by the processor, that the first email is representative of a threat to the enterprise based on an output produced by a computer-implemented model for which the first email is provided as input;
    generating, by the processor, a record of the threat by populating a data structure with information related to the first email, wherein the information specifies a sender identity, a sender domain, a sender address, a geographical origin, a subject, a threat type, a target, or any combination thereof;
    protecting, by the processor, the enterprise against the threat by—
       (i) applying the data structure to inboxes of at least some of the employees to determine whether the first email is part of a campaign, and
       (ii) applying the data structure as a filter to inbound emails addressed to the employees; and
    in response to a determination that a second email is located in the mailbox establishing by the processor that the second email is not representative of a threat to the enterprise based on an output produced by a computer-implemented model for which the second email is provided as input, and in response to the determination, moving a copy of the second email to a predetermined location comprising at least one of: an inbox of a user and a dedicated folder of a user.

2. The method of claim 1, wherein the mailbox is associated with an address with which only addresses corresponding to a domain associated with the enterprise are permitted to communicate.

3. The method of claim 1, further comprising:
    storing, by the processor, the record in a database in which threats are systematically logged over time, wherein the database includes a series of records, each of which corresponds to a different email forwarded to the mailbox.

4. The method of claim 3, further comprising:
    receiving, by the processor, input indicative of a query that specifies a criterion;
    searching, by the processor, the series of records to identify a matching record whose corresponding email satisfies the criterion; and
    causing, by the processor, display of the matching record on an interface.

5. The method of claim 1, further comprising:
    discovering, by the processor in the inboxes of the at least some of the employees, a series of emails that are similar to the first email; and
    defining, by the processor, the campaign by programmatically associating the first email and the series of emails.

6. The method of claim 1, wherein the first email is addressed to an employee, and wherein the computer-implemented model for which the first email is provided as input is trained using past emails addressed to the employee that have been verified as non-malicious.

7. The method of claim 1, further comprising notifying, by the processor in response to said establishing, an analyst responsible for monitoring security of the enterprise of the threat.

8. The method of claim 1, wherein applying the data structure to the inboxes of at least some of the employees causes the processor to identify past emails, if any, that share the information in common with the first email, and wherein applying the data structure as the filter causes the processor to identify inbound emails, if any, that share the information in common with the first email.

9. A non-transitory computer-readable medium with instructions stored thereon that, when executed by a processor of a computing device, cause the computing device to perform operations comprising:
    establishing a connection with an email system employed by an enterprise;
    monitoring, via an application programming interface, a mailbox to which employees of the enterprise are able to forward emails deemed suspicious for analysis;
    in response to determining that a first email is located in the mailbox, establishing that the first email is representative of a threat to the enterprise based on an output produced by a computer-implemented model for which the first email is provided as input;
    generating a record of the threat by populating a data structure with information related to the first email, wherein the information specifies a sender identity, a sender domain, a sender address, a geographical origin, a subject, a threat type, a target, or any combination thereof;
    protecting the enterprise against the threat by—
       (i) applying the data structure to inboxes of at least some of the employees to determine whether the first email is part of a campaign, and
       (ii) applying the data structure as a filter to inbound emails addressed to the employees; and in response to determining that a second email is located in the mailbox, establishing that the second email is not representative of a threat to the enterprise based on an output produced by a computer-implemented model for which the second email is provided as input, and in response to the determination, moving a copy of the second email to a predetermined location comprising at least one of: an inbox of a user and a dedicated folder of a user.

10. The non-transitory computer-readable medium of claim 9, wherein the mailbox is associated with an address with which only addresses corresponding to a domain associated with the enterprise are permitted to communicate.

11. The non-transitory computer-readable medium of claim 9, wherein the operations further comprise:
storing the record in a database in which threats are systematically logged over time, wherein the database includes a series of records, each of which corresponds to a different email forwarded to the mailbox.

12. The non-transitory computer-readable medium of claim 11, wherein the operations further comprise:
receiving input indicative of a query that specifies a criterion;
searching the series of records to identify a matching record whose corresponding email satisfies the criterion; and
causing display of the matching record on an interface.

13. The non-transitory computer-readable medium of claim 9, wherein the operations further comprise:
discovering in the inboxes of the at least some of the employees, a series of emails that are similar to the first email; and
defining the campaign by programmatically associating the first email and the series of emails.

14. The non-transitory computer-readable medium of claim 9, wherein the first email is addressed to an employee, and wherein the computer-implemented model for which the first email is provided as input is trained using past emails addressed to the employee that have been verified as non-malicious.

15. The non-transitory computer-readable medium of claim 9, wherein the operations further comprise notifying, in response to said establishing, an analyst responsible for monitoring security of the enterprise of the threat.

16. The non-transitory computer-readable medium of claim 9, wherein applying the data structure to the inboxes of the at least some of the employees identifies past emails, if any, that share the information in common with the first email, and wherein applying the data structure as the filter identifies inbound emails if any, that share the information in common with the first email.

17. A system comprising:
a processor configured to:
establish a connection with an email system employed by an enterprise;
monitor a mailbox to which employees of the enterprise are able to forward emails deemed suspicious for analysis;
in response to a determination that a first email is located in the mailbox, establish, by the processor, that the first email is representative of a threat to the enterprise based on an output produced by a computer-implemented model for which the first email is provided as input;
generate a record of the threat by populating a data structure with information related to the first email, wherein the information specifies a sender identity, a sender domain, a sender address, a geographical origin, a subject, a threat type, a target, or any combination thereof;
protect the enterprise against the threat by—
(i) applying the data structure to inboxes of at least some of the employees to determine whether the first email is part of a campaign, and
(ii) applying the data structure as a filter to inbound emails addressed to the employees; and
in response to a determination that a second email is located in the mailbox, establish that the second email is not representative of a threat to the enterprise based on an output produced by a computer-implemented model for which the second email is provided as input, and in response to the determination, move a copy of the second email to a predetermined location comprising at least one of: an inbox of a user and a dedicated folder of a user; and
a memory coupled to the processor and configured to provide the processor with instructions.

18. The system of claim 17, wherein the mailbox is associated with an address with which only addresses corresponding to a domain associated with the enterprise are permitted to communicate.

19. The system of claim 17, wherein the processor is further configured to store the record in a database in which threats are systematically logged over time, wherein the database includes a series of records, each of which corresponds to a different email forwarded to the mailbox.

20. The system of claim 19, wherein the processor is further configured to:
receive input indicative of a query that specifies a criterion;
search the series of records to identify a matching record whose corresponding email satisfies the criterion; and
cause display of the matching record on an interface.

21. The system of claim 17, wherein the processor is further configured to:
discover in the inboxes of the at least some of the employees, a series of emails that are similar to the first email; and
define the campaign by programmatically associating the first email and the series of emails.

22. The system of claim 17, wherein the first email is addressed to an employee, and wherein the computer-implemented model for which the first email is provided as input is trained using past emails addressed to the employee that have been verified as non-malicious.

23. The system of claim 17, wherein the processor is further configured to notify, in response to said establishing, an analyst responsible for monitoring security of the enterprise of the threat.

24. The system of claim 17, wherein applying the data structure to the inboxes of the at least some of the employees identifies past emails, if any, that share the information in common with the first email, and wherein applying the data structure as the filter identifies inbound emails, if any, that share the information in common with the first email.

* * * * *

UNITED STATES PATENT AND TRADEMARK OFFICE
CERTIFICATE OF CORRECTION

PATENT NO. : 11,252,189 B2
APPLICATION NO. : 17/155843
DATED : February 15, 2022
INVENTOR(S) : Evan Reiser et al.

Page 1 of 1

It is certified that error appears in the above-identified patent and that said Letters Patent is hereby corrected as shown below:

In the Specification

In Column 17, Line(s) 39, after "1326", insert --,--.

In the Claims

In Column 19, Line(s) 60, Claim 1, after "mailbox", insert --,--.
In Column 19, Line(s) 60, Claim 1, after "establishing", insert --,--.
In Column 19, Line(s) 60, Claim 1, after "processor", insert --,--.
In Column 21, Line(s) 50, Claim 16, after "emails", insert --,--.
In Column 22, Line(s) 59, Claim 24, after "inboxes of", delete "the".

Signed and Sealed this
Twenty-seventh Day of September, 2022

Katherine Kelly Vidal
*Director of the United States Patent and Trademark Office*